Tatsuro Nishitani
Inventor
by
Polachek & Saulsbury
ATTORNEYS

Tatsuro Nishitani
Inventor
by Polachek & Saulsbury
ATTORNEYS

Tatsuro Nishitani
Inventor
by Polachek & Saulsbury
ATTORNEYS

United States Patent Office 3,521,011
Patented July 21, 1970

3,521,011

SIMPLE DISC-RECORDING AND TRANSCRIPTION APPARATUS

Tatsuro Nishitani, Tokyo, Japan, assignor to Tomy Kogyo Co., Ltd., Tokyo, Japan

Filed Feb. 20, 1968, Ser. No. 706,889
Claims priority, application Japan, Sept. 21, 1967, 42/60,688
Int. Cl. G11b 3/06, 3/34
U.S. Cl. 179—100.4 4 Claims

ABSTRACT OF THE DISCLOSURE

A simple disc-recording and transcription apparatus so arranged as to permit its user to form a sound groove on a recording sheet of the type for use as a voice mail or a toy record and to playback the same both with a simple procedure. The apparatus includes a recorder head arm consisting of a double-arm structure and a playback pickup arm consisting of a single tone arm, and is adapted to produce the sound groove by the so-called "press-formation method."

The present invention is concerned with a disc-recording and transcription apparatus, and more particularly, it relates to a simplified disc-recording and transcription apparatus so arranged as to permit its user to form a sound groove on a record disc of the type for use as a voice mail or a toy record and to playback the same both with a simple procedure.

It is an object of the present invention to provide a disc-recording and transcription apparatus of the electric conversion type which can be used as a toy.

The apparatus of the present invention is featured by its simple structure which, as a toy, can be operated easily by a small child, and provides a convenience that the recorded disc is of such a practical utility as can be played back not only on the apparatus of the present invention, but also on an ordinary nontoy phonograph or record player as well.

It is, therefore, another object of the present invention to provide a simplified disc-recording and transcription apparatus which permits its user to produce a sound groove on a record disc in such a way that the record disc is of a sufficient utility value.

Generally speaking, the production of a record disc carrying a sound groove thereon, or in other words, the cutting of a spiral sound groove on a given plastic sheet or film has not been considered an art that can be performed easily by a small child. Therefore, if a small child could produce his own record disc for himself with a simple procedure by recording his own voice, his favorite music or other sounds on a record disc as desired, it surely would be a wonderful thing for him and he would be more than happy to do so.

According to the conventional conception, the operational of converting a sound received into a microphone to an electric signal and the operation of utilizing this signal to drive a sound-groove cutter to produce a sound track, naturally required the provision of at least a means for amplifying said sound signal and a means for transmitting a sufficiently powerful electric signal to the magnetic circuit of the record-groove cutter head. It has been a commonly accepted idea that such amplifying means employ a specific device such as a transistor. It is for this reason that toys designed so as to produce sounds contained one or more transistor devices.

The apparatus of the present invention comprises means for press-forming a sound groove on the face of a desired plastic recording sheet which is effected by a recording stylus with the help of the gravity of the cutter head, and simple means for transmitting the aural output of a carbon microphone to the magnetic circuit of a recorder head via an output transformer.

The terms "press-formation of a sound groove" herein referred to strictly does not means cutting or carving of the surface layer of a recording sheet, but these terms signify the formation of a desired sound groove on the face of the recording sheet in such a way that a frictional heat is generated between the tip of a recording stylus and a rotating plastic recording sheet on which the tip of said stylus is applied in a pressure contact therewith, so that the surface layer of said sheet becomes locally softened due to the generated heat and that the pressure which is applied onto the softened area of the plastic sheet by the contacting tip of the stylus loaded with the gravity of the recorder head causes a spiral sound groove to be formed on the face of the rotating recording sheet without in any way scraping or carving the surface layer of the sheet.

Therefore, a still another object of the present invention is to provide an apparatus for forming a spiral sound groove on a plastic recording sheet, comprising a simple recording circuit consisting of only a transformer which couples a carbon microphone to the electric circuit of a magnetic recorder head provided with a recording stylus, said formation of a spiral sound groove being performed by said stylus while pressing on the softened surface layer of the recording sheet with its tip without scraping or carving said surface layer.

The apparatus of the present invention is provided with not only a recording mechanism but also a transcirbing or playback mechanism. This playback mechanism, however, comprises only a carbon pickup and an output transformer for transmitting the electric signal of the pickup to the speaker system, this latter system, which is capable of producing a sufficiently large sound, being operated without requiring the provision of any means for amplifying the output of said pickup, such as a transistor device. The recording circuit and the playback circuit of these mechanisms are so arranged that the changeover of the connections thereto may be made by the manipulation of a single rotary switch so that the user can select one of the two performances as desired.

A turntable for carrying a record disc or sheet is provided on the apparatus. Said turntable is driven by an electric motor. The electric circuit of this motor is controlled by a rotary switch provided thereabove.

It is, therefore, a further object of the present invention to provide an apparatus consisting essentially of a limited variety of parts, i.e., an electric motor, a turntable, a carbon pickup, a loudspeaker, an output transformer, a carbon microphone, a recorder head and a battery for these parts, all of which are housed in a casing which is of such a compact size as can be easily carried along by a small child, said apparatus being operative so as to produce a spiral sound groove on a record sheet such that the completed record disc is of such a sufficient utility as can be played back also on an ordinary nontoy record player.

One feature of the apparatus of the present invention is in the fact that its electric arrangement is epochmakingly simple and that this minimizes the number of the component parts to an extreme extent. Therefore, not only the apparatus can be available at a low price, but also it requires no skilled technique or particular training to operate it.

Another feature of the apparatus of the present invention lies in the unique design of the pickup arm which is so constructed as to permit the user to obtain a recorded sheet which produces sounds of good tone quality.

Still another feature is found in the arrangement of the pickup arm which is disposed independently from the recording arm, both of which are housed in the same casing, so that, as soon as a recording is completed, the user can play back the fresh record on the same turntable which has been used for the recording.

Other objects, features and attendant advantages will become apparent by reading the following detailed description, and particularly by referring to the appending claims and accompanying drawings in which:

Figure 1:
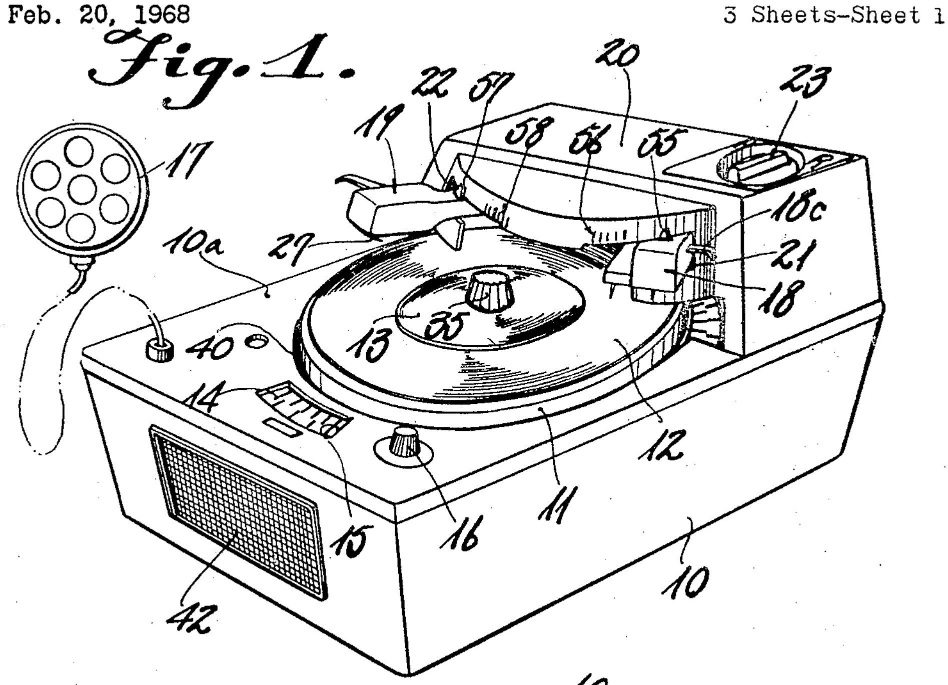
FIG. 1 is a perspective view of the apparatus as a whole of the present invention.

As is clearly shown in FIG. 1 of the drawing, the apparatus of the present invention is provided with a casing 10 which is of a cabinet type such that can be easily carried along by a child.

Reference numeral 11 represents a turntable. A record disc 12 placed on this turntable is held in place by a guide disc 13 having a guide groove formed on the surface thereof. Numeral 14 represents a stroboscope provided on a flange portion of said turntable. The pattern of this stroboscop is viewed through an opening 15 found through an upper panel 10*a* of the casing. Numeral 16 represents a knob for controlling the rotation speed of the turntable. Numeral 17 represents a carbon microphone which is of the type commonly used in telephone apparatus. Numerals 18 and 19 represent a recording arm and a pickup arm, respectively. The base portions of these two arms where these arms are pivotally supported on the casing are covered by a partial cover 20. These arms are adapted for being received, to rest, in anchoring notches 21 and 22 which are provided, in a pair, in the front side of said cover.

Numeral 23 represents a selector knob for effecting a changeover from the recording state to the transcribing state and vice versa. Below the shaft of this selector knob is provided a rotary switch which is not shown.

Figure 2:
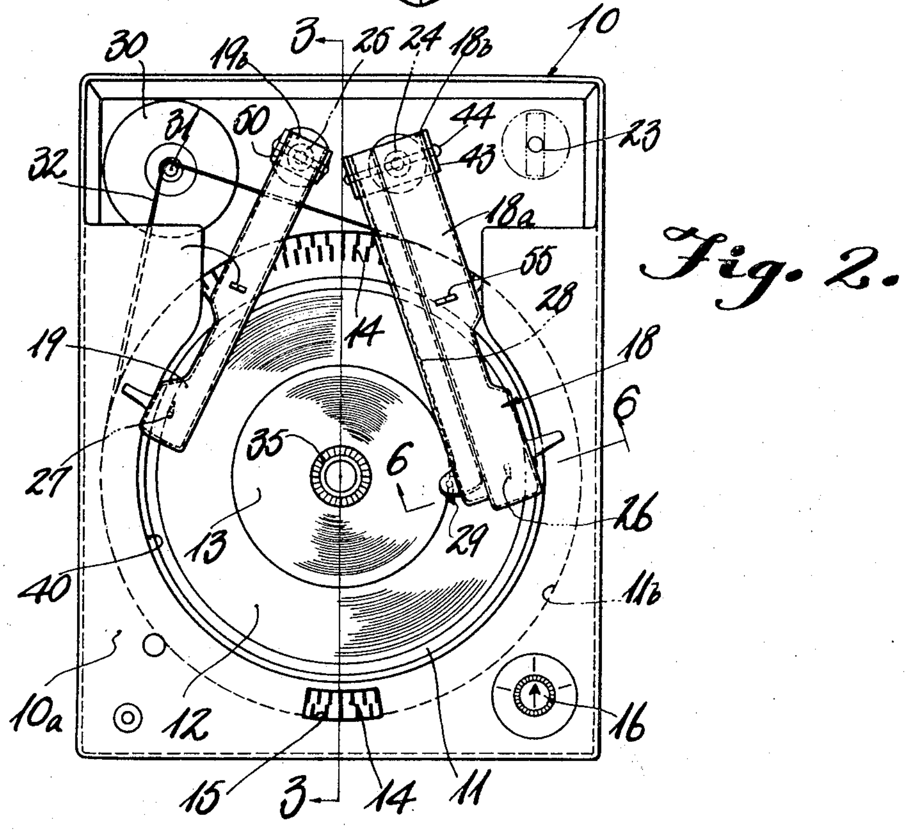
FIG. 2 is a plan view of the same apparatus with its partial cover broken away.
Figure 3:
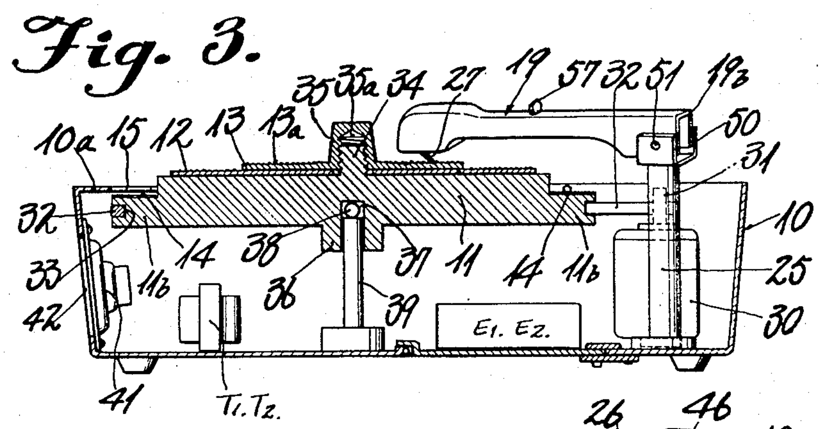
FIG. 3 is a longitudinal sectional view taken along the line 3—3 in FIG. 2.

As is clearly noted from FIGS. 2 and 3 both the recording and the pickup arms 18 and 19 are supported at their bases in the casing 10 for vertical as well as horizontal pivotal movements, or more specifically, they are supported on one end, respectively, of the supporting rods 24 and 25 which extend upright from the bottom panel of the casing.

The recording arm 18, in particular, consists of a main arm 18*a* and a parallel side arm 28 both of which are supported side by side on the same common shaft for pivotal movement. A guide stylus 29 adapted to engage and trace the spiral groove of the grooved guide disc 13 is provided at the foremost end of this side arm.

Numeral 30 represents an electric motor provided in the casing. An endless belt 32 wound around a pulley 31 of said motor is applied to the grooved wheel 33 which is provided around the external periphery of the turntable 11 so as to rotate the latter clockwise.

It is therefore, to be noted that an arrangement is provided such that the free end of the arm of the recording system extends so as to follow the direction of the rotation of the turntable, while the free end of the pickup arm extends against the direction of the rotation of the turntable.

A pickup stylus 27 is so arranged as to be mounted on the head portion of the recording arm 19 with an inclination toward the base of said arm 19 where the latter is pivotally supported, so that, in operation, the stylus is not held against the rotational direction of the rotating record disc, and thus the playback operation is performed smoothly.

The turntable 11 comprises a platform section on which is placed a record disc 12 and a flange section 11*b* which extends outwardly from the lower peripheral portions on the circumference of said turntable. In the center of the turntable having a grooved wheel formed around its periphery is provided a threaded stopper hub 34 which is adapted to pass through the opening provided centrally of the record disc 12 when the latter is placed on the turntable and to also receive a guide disc 13 having a hollow threaded central hub portion serving as a knob-and-cap 35 which is screwed onto said stopper hub to thereby fix the record disc 12 onto the face of said turntable.

A sleeve 36 for receiving a supporting shaft is provided centrally on the bottom face of said turntable 11. Inserted in the bore 37 of this sleeve 36 are a ball 38 and also a supporting shaft 39 beneath said ball, said supporting shaft being provided centrally on the bottom panel of the casing so as to extend upright therefrom. Said ball and said supporting shaft inserted in the sleeve contribute to the free rotation of said turntable.

The flange section 11*b* of the turntable is hidden under the upper panel 10*a* of the casing, while the platform section of the turntable protrudes outwardly through the opening 40 of said panel. A conventional stroboscopic pattern 14 is provided on the upper face of said flange, said pattern being arranged so that it is viewed from outside the casing through the viewer opening 15 provided on the upper panel 10*a*.

Numeral 41 represents a loudspeaker which is attached to the inside face of a sound-emitting lattice work 42 (see FIG. 3.)

Figure 4:
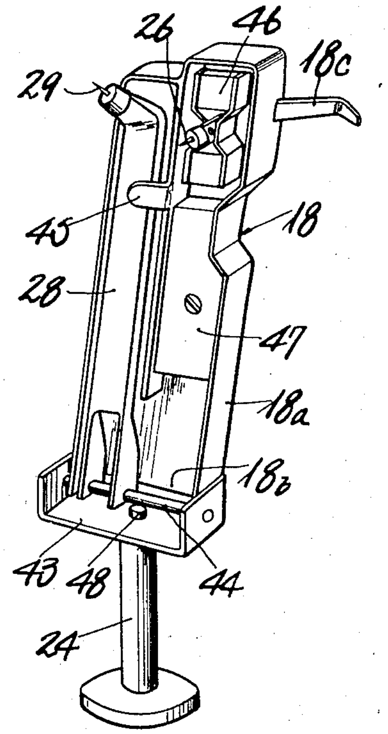
FIG. 4 is a perspective view, in an enlarged scale, of a recording arm in its erected position to show the bottom side thereof.

FIG. 4 is intended to show the recording arm system, wherein the main arm 18*a* consists of a member having a channel-like cross section, the base portion of said main arm being supported, for vertical pivotal movement, by a shaft 44 via U-shaped bracket 43 which, in turn, is supported, for horizontal rotation, on one end of the upright supporting rod 24 provided within the casing 10.

A side arm 28 is supported at its base, for vertical pivotal movement, by the same shaft 44 on the proximal side of said main arm so as to be closely adjacent therewith. Said side arm 28 is so arranged that it can pivot vertically within a predetermined range of angle on the proximal side of the main arm 18*a* independently thereof, and also that it can be lifted upwardly together with the main arm by being hooked by a stopper hook 45 when the main arm is lifted upwardly.

A guide stylus is provided on the foremost end of said side arm 28. An electric conversion type magnetic recorder head 46 containing a recording stylus 26 is provided inside the foremost end portion of said main arm 18*a*.

Numeral 47 represents a weight for producing a proper stylus pressure of the recorder head 46.

This set of recording arm not only can freely rotate horizontally about a pin 48 of said supporting rod, but also can effect free vertical pivotal movement about the shaft 44. The side arm 28 can also make its own vertical pivotal movement to a limited extent independently of said main arm 18*a* on the proximal side of the latter arm.

Figure 5:
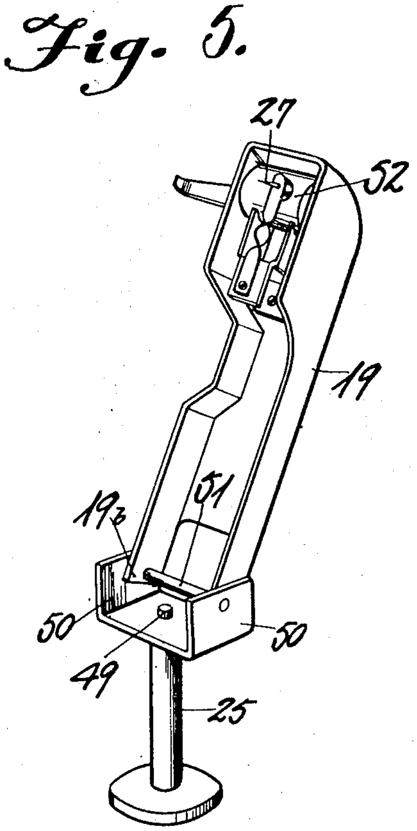
FIG. 5 is a perspective view, in an enlarged scale, of a pickup arm in its erected position to show the bottom side thereof.

FIG. 5 illustrates a pickup arm system. This pickup arm 19 is of a configuration which is represented by a U-shape cross section similar to that of the aforesaid recording arm, and this pickup arm is supported at its base 19*b* by a shaft 51 on a bracket 50 which is supported by a pin 49 located at one end of a supporting rod 25 which is fixed in said casing 10. A carbon pickup element 52 containing a pickup stylus 27 is provided inside the foremost end portion of this pickup arm 19.

With ordinary pickup arms of nontoy as well as toy phonographs, it has been the practice to layout the arrangement of this pickup stylus so as to incline it toward the open end of the pickup arm 19. According to the present invention, however, conversely to the the prior art, this pickup stylus is inclined toward the base 19*b* of the pickup arm 19 (see FIG. 3).

Figure 6:
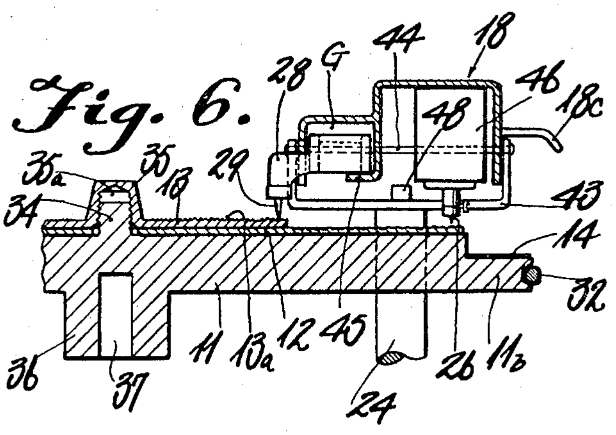
FIG. 6 is a fragmentary sectional view, also in an enlarged scale, taken along the line 6—6 in FIG. 2.

FIG. 6 shows the state in which the recording arm system is operated for the purpose of recording.

In this respect, description will hereunder be made as to a part of the recording operation.

A recording sheet 12 consisting of an appropriate plastic sheet is used. This plastic sheet does not necessarily have to be circular in shape. It may be in the form of a picture postcard carrying a desired picture or pattern, or it may be a square card printed in beautiful colors. In order to place such a recording sheet on the turntable 11, an opening formed in the center of this sheet is brought into engagement with a threaded stopper hub 34 protruding centrally of the turntable 11, and thereafter, a guide disc 13 which has a shape more or less like a very small record disc is superposed on the record disc which is already placed on the turntable.

The face of the flange section of the guide disc 13 is preliminarily provided with a spiral guide groove 13*a*. A cap-like knob 35 having a threaded bore 35*a* on the reverse side is provided centrally of said guide disc so as to protrude outwardly from the surface of the disc. By screwing the threaded hub 34 of the aforesaid turntable into the threaded bore 35*a*, the recording sheet 12 is fixed onto the turntable 11.

A sound groove is press-formed with the recording stylus 26 on the face of the recording sheet 12 starting at a portion close to the outermost periphery of the sheet. In order to start recording, a lug 18*c* which projects outwardly from the recording arm 18*a* is first engaged by a finger of the user and a slight force is applied so as to bring the recorder head closer to the face of the recording sheet.

At this moment, the foremost end portion of the side arm 28 is lowered up to the level at which a further downward movement of the side arm is inhibited by the stopper hook 45, while the tip of the stylus 29 of this side arm arrives onto the groove 13*a* formed on the face of the guide disc 13 earlier than is brought the stylus of the main arm into engagement with the face of the recording sheet. Then, the tip of the recording stylus 26 is brought into engagement with the face of the recording sheet during the period in which the recorder head is lowered further toward the face of the recording sheet by a distance corresponding to the gap G (see FIG. 6) left between the upper face of the side arm 28 and the inner face of the top side wall of the main arm which accommodates said side arm.

In other words, the position on the face of the recording sheet 12 in which the recording stylus 26 is first placed is preliminarily determined in parallel relationship with the position of contact between the guide disc and the guide stylus 29 by the action of a sort of parallel ruler which is afforded by the guide stylus 29 which is adapted to be brought into engagement with the guide groove 13*a* on the guide disc earlier than is the recording stylus 26 brought into engagement with the face of the recording sheet.

Accordingly, the distance between this guide stylus 29 and the recording stylus 26 is determined, as desired, in accordance with the width of the sound track portion in which the user wishes to perform recording.

With the aforesaid arrangement, when the assembly of the guide disc 13, the recording sheet 12 and the turntable carrying the disc and the sheet is rotated, the guide stylus 29 is gradually displaced inwardly as it follows the running spiral groove 13*a* of the guide disc 13, pulling the recording stylus 26 in the centripetal direction, with a result that this latter stylus 26 is gradually press-forms, on the face of the recording sheet 12, a spiral groove concentrically with the guide spiral 13*a*.

There are two important aspects to be noted with respect to the recording arm system. One of them concerns the mechanism that, as already described, the guide stylus 29 is brought into engagement with the guide groove 13*a* prior to the engagement of the recording stylus 26 with the sheet 12 so that the positioning of the recording stylus 26 is always effectively performed. The other aspect relates to the outstanding convenience that, while the side arm 28 for guiding the main arm 18*a* is pivotally supported at its base by the shaft 44 coaxially with said main arm 18*a*, these two arms are not mechanically in close cooperative relationship to each other, and that, therefore, the scratch noise which is produced on the guide groove 13*a* is not transmitted to the recording stylus 26. The first one of the aspects is of an effect that the recording operation undertaken by a child is facilitated, while the other of the aspects is represented by the advantage that the recorded discs have minimum scratch noise.

Figure 7:
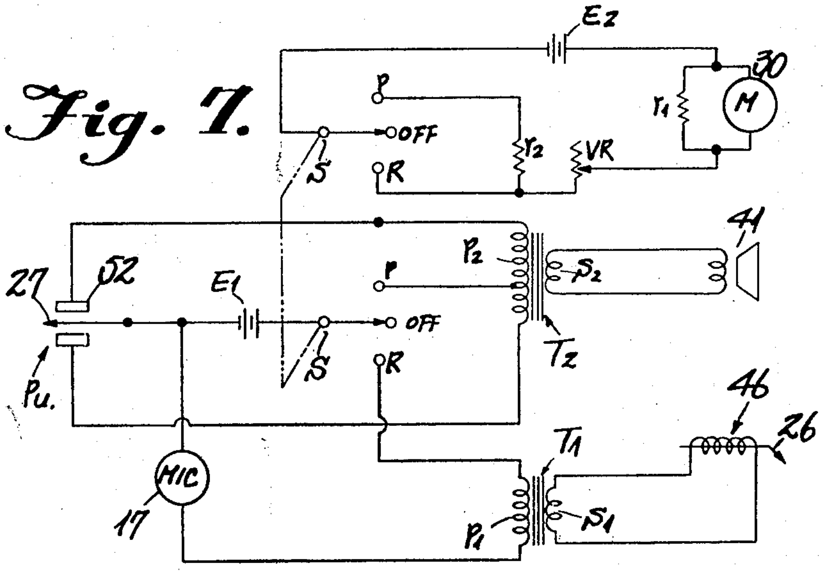
FIG. 7 is a schematical diagram of the circuit for use in the apparatus of the present invention.

FIG. 7 is a schematic diagram of the electric system for use in the apparatus of the present invention. The main parts incorporated in this entire system consist of a motor 30 for driving the turntable, a carbon microphone 17 for use in the recording, a recorder head 46, a pickup P*u* for use in playback, a speaker 41, output transformers $T_1$ and $T_2$ which are connected to these recording and playback circuits, respectively, a rotary switch S for selecting these circuits by means of a knob 23, a power source $E_1$ for these circuits and a power source $E_2$ for the motor.

Description will next be directed to the procedure of recording operation. First, the rotary switch is turned so that its indicator is in register with the recording position R to close the respective points of contact R of said switch. As a result, the circuit of the power source $E_2$ of the motor is closed, and the motor begins to rotate at a speed corresponding to a constant resistance value which is established by a variable resistor VR, and drives the turntable.

When, the recording arm 18 is released from the engagement in the anchoring opening 21, and the recorder head 46 is placed downwardly upon the recording sheet 12 while the guide stylus 28 is in its state of being in engagement with the guide groove 13*a* (see FIGS. 1, 6 and 7).

The circuit of the microphone 17, via the power source $E_1$ and the contact R, forms a loop of the primary coil $P_1$ of the transformer $T_1$, and is operative so as to excite the circuit of the secondary coil $S_1$ of said transformer $T_1$, and further to oscillate the coil of the magnetic recorder head 46 which is connected to both terminals of the aforesaid secondary coil circuit.

In other words, the input aural signal introduced into the microphone 17 is converted directly, by the excitation of its carbon, to an electric signal and this latter signal, in turn, drives the recorder head 46 without the need of passing through a special stage consisting of a member such as a transistor amplifier.

In this state of the apparatus, the tip of the recording stylus 26, being assisted by the load applied thereto by the weight 47, press-forms a spiral sound groove on the sheet, while being guided by the guide groove 13*a* (see FIG. 4).

The progress of the recording, or in other words, the degree of displacement of the stylus 26 or the arm carrying it is recognized also by the correlation between an indicating member 55 projecting upwardly from the upper wall of the recording arm and the graduation provided on the front side face of the partial cover 20.

In order to playback the record disc which has been recorded in this way, it is required first to shift the position of the switch S over to P to close the contacts of P. In this state, the power source $E_1$ is connected between the pickup stylus 27 and the intermediate tap of the primary coil $P_2$ of the transformer $T_2$ and at the same time the carbon excitation unit of this pickup is connected to both terminals of the primary coil $P_2$ to form a primary loop, with the result that the input signal of this loop excites the secondary side $S_2$ of the transformer $T_2$. This secondary side of the transformer $T_2$ constitutes a loop having the voice coil of the speaker 41 is driven by a secondary electric signal conducted thereto by an input from the pickup, and thus a sound is emitted from the speaker.

This playback operation does not employ any amplifier either, such as a transistor, to amplify the output of the pickup. The degree of the displacement of the pickup arm or its stylus 27 can be recognized also by the correlation between the indicating member 57 projecting from the upper face of the pickup arm 19 and the graduation provided on the front face of the partial cover 20. The torque of the motor 30 which drives the turntable is constant, and, therefore, in case the heavy resistance of the recorder head which occurs during the recording operation is applied to the motor via the turntable, the number of rotation per minute of the motor will decrease, while, on the other hand, the light load of the pickup head will, due to the similar reason, result in an increased number of rotation of the motor. Such uneven speed of rotation is quite inconvenient for both recording and playback.

An arrangement is provided, therefore, in the power source circuit of the motor 30 such that a resistor $r_2$ having a predetermined value of resistance is inserted in this circuit for the playback operation where the rotation load of the motor is small, whereas this inserted resistor $r_2$ is released therefrom where a heavy rotation load is applied to the motor, so as to reduce the load. This shift is effected by the changeover of connections at the contacts P and R of said rotary switch S. The symbol $r_1$ represents a starting resistor which is inserted in parallel in the circuit of the motor 30. This resistor is intended for facilitating the starting of this motor and at the same time for the elimination of the uneven rotation due to the change in the load applied to the motor. VR represents a variable resistor for adjusting the rotation speed of the motor, and $E_2$ represents a power source battery for said motor.

As has been described, according to the present invention, there is provided a simplified apparatus which permits its user to record on a recording sheet with an outstandingly simple procedure and which also permits the user to playback the record on the same turntable which has been used for said recording. Furthermore, the apparatus of the present invention permits a child to produce a recorded phono-sheet which may be in the form of a picture postcard or any other desirde shape with any desired pattern. Therefore, it can be said that the present invention has introduced an epoch-making commercial article in the field of recording art.

Moreover, this recorded sheet which is produced with a very simple procedure gives out sound which is good in tone quality, and one can record on the recording sheet, not only more voices, but also sound of music produced from instruments or any other sound as desired, and playback the same in a satisfactory way.

I claim:

1. A recording and transcription apparatus adapted to form a spiral sound groove on a plastic recording sheet and to playback the recorded sound, comprising a casing a motor driven horizontal turntable disposed on top of the casing, said casing having a cover partially overhanging the turntable; a recorder arm assembly comprising a vertical post located under the partial cover of the casing; a bracket carried by the shaft and rotatable on a vertical axis; a rigid horizontal cross shaft carried by the bracket; a channel shaped main arm member having one end pivotally engaged on said cross shaft; an electromagnetic recording head disposed in said arm member at the other end thereof, said head carrying a recording stylus for forming said sound groove on said plastic recording sheet when the sheet is mounted on the turntable; a weight secured inside said arm member so that the stylus applies predetermined pressure to the recording sheet; a side arm pivotally engaged at one end thereof on said cross shaft, said side arm carrying a guide stylus at the other end thereof adjacent said recording stylus, said side arm being disposed inside said arm member and spaced from opposite sides thereof so that both the guide stylus and recording stylus are protectively covered by the main arm member and the lateral spacing of the styluses is fixed while the side arm is pivotable on said cross shaft independently of the main arm member; a stopper member carried by the main arm member engaging the side arm to limit downward rotation of the side arm with respect to the main arm member, said cross shaft constituting the sole direct support for said main arm member and said side arm so that lateral vibration of the guide stylus cannot be transmitted to recording stylus via the main arm; a grooved sheet mounted on the turntable so that the guide stylus follows the groove in the guide disc while the recording stylus forms a groove on the recording sheet; and cooperative indicator means on said main arm and cover for indicating the position of said recording stylus at all times relative to the periphery of the turntable.

2. A recording and transcription apparatus as defined in claim 1, wherein the turntable has a threaded axial post extending upwardly therefrom; said guide disc having a central threaded hub engaged on the threaded post so that the guide disc is held fixed on the turntable and bearing on the record sheet to prevent rotation of the same with respect to the turntable when record sheet is disposed on the turntable with an annular area of the record sheet exposed radially outward of the guide disc.

3. A recording and transcription apparatus as defined in claim 1, further comprising a pickup arm pivotally mounted at one end thereof under said cover and laterally spaced from the recording arm; an electromagnetic pickup head mounted at the other end of the pickup arm; a pickup stylus carried by the pickup head for following the groove in the record sheet formed by the recording stylus; and other indicator means on the pickup arm and cover for indicating the position of said pickup stylus radially of the turntable.

4. A recording and transcription apparatus as defined in claim 3 further comprising a carbon microphone and first transformer connected in a first circuit with said recording head; a loudspeaker and second transformer connected in a second circuit with said pickup head; a battery inside the casing; and switch means on the casing setttable to different positions and connected in circuit with the battery and both the first and second circuit for selectively energizing said first and second transformers for forming said sound groove on the recording sheet and for transcribing sound from the recording sheet respectively.

References Cited

UNITED STATES PATENTS

| | | | |
|---|---|---|---|
| 2,314,345 | 3/1943 | Cortella | 274—13 |
| 2,658,762 | 10/1953 | Begun | 274—13 |
| 2,250,242 | 7/1941 | Thompson | 179—100.4 |

OTHER REFERENCES

Knowlton, A. E.: "Standard Handbook for Electrical Engineers," 9th Edition, 1957. McGraw-Hill, New York.

TERRELL W. FEARS, Primary Examiner

J. ROSENBLATT, Assistant Examiner